March 25, 1958 A. HEMEL 2,828,365
RELAYLESS LINE CIRCUIT
Filed April 17, 1956
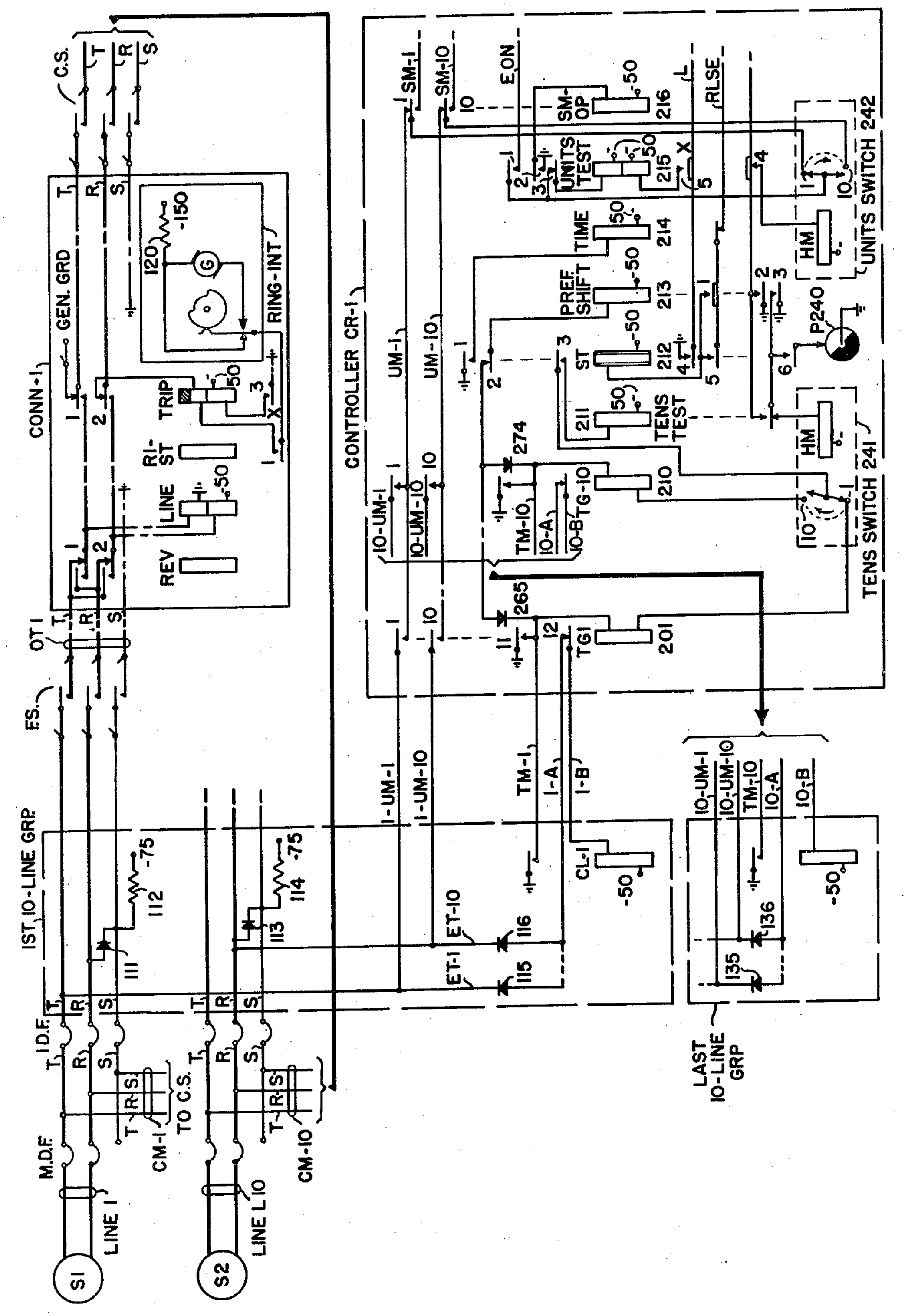

United States Patent Office 2,828,365 Patented Mar. 25, 1958

2,828,365

RELAYLESS LINE CIRCUIT

Albert Hemel, Skokie, Ill., assignor to International Telephone and Telegraph Corporation, New York, N. Y., a corporation of Maryland Application April 17, 1956, Serial No. 578,823
11 Claims. (Cl. 179—18)

This invention relates in general to relayless line circuits suitable for use with two-wire lines used in switching systems. Its principal object is to provide a satisfactory and reliable relayless line circuits of the indicated type which provides the general operational features of a line circuit having both a line relay and a cutoff relay.

In prior attempts of this nature, the individual line relays were replaced by a relatively small number of line relays common to all the lines of a group and each individual cutoff relay was replaced by a number of resistances of high value. In such attempts, the common line relay arrangement was unsatisfactory as its use was limited to small private switchboards serving well-insulated lines located largely inside of buildings as the cumulative line leakage, particularly to ground, often resulted in false operation of the line relay. The use of resistance networks in place of cutoff relays was likewise unsatisfactory as parasitic current flow through such resistances often established a potential on the test conductor which resulted in false finder operation. Also, such resistances often reduced the effective ringing voltage during the ringing period.

According to the invention, a common line relay arrangement is employed which is not subject to false operation from leakage to ground and an impedance network arrangement is employed in place of the usual cutoff relay which does not permit current flow from the line conductors through the network other than during line-finding action.

The disclosed arrangement is such that one of line conductors is connected to a negative pole or tap of the exchange battery through a common line relay in series with a rectifier diode; the other conductor of the line is connected to a more negative pole or tap of the exchange battery over a series circuit path through a rectifier diode and a resistor; and the test or sleeve conductor is connected to the midpoint of the rectifier and resistor. In such an arrangement, in response to initiation of a call, current flow through the line relay and associated rectifier diode circuit, over the line loop, and through the series diode and resistor circuit operates the line relay to control the extension of a finder connection, the rectifier diodes being poled to permit current flow from the first battery tap to the more negative battery tap. After line-finding action, or seizure of a called line terminal, the sleeve conductor becomes closed an grounds the junction point of the rectifier diode and series resistor. This ground masks the high negative potential and, depending on the polarity of the usual battery feed connection to the line conductors, either establishes a potential-reversed connection which due to the poling of the diodes prevents any current flow therethrough or places the junction point at the same potential as the connected line conductor. In either case, the sleeve connection to the junction of the diode and resistor does not affect the normal line feed current.

Further, according to the invention, a ringing control arrangement is provided which maintains the ringing voltage level at a point such that the potential-masking connection made by the sleeve conductor is not overcome by the normal ringing voltage applied to the line conductor of a called line.

The above-mentioned and other features and objects of this invention and the manner of attaining them will become more apparent and the invention itself will be best understood, by reference to the following description of an embodiment of the invention taken in conjunction with the accompanying drawing wherein a group of relayless line equipments and associated switching and control stages are shown for extending connections between calling and called lines.

For brevity, the disclosed system serves 100 lines of which only lines L1 and L10 of the first ten-line group are shown. A common line relay, such as CL–1, is provided for each group of ten lines, the common line relay being associated with the lines of its group over extension conductors such as ET–1 to ET–10 and associated isolating rectifiers, such as 115 and 116. The usual individual cutoff relays are each replaced by an impedance network comprising a rectifier diode, such as 111, and an associated resistor 112.

The common line relay of each ten-line group is associated with controller CR–1 over associated control conductors such as TM–1, 1–A and 1–B and the individual lines of such group are associated with the controller over respective units mark conductors UM–1 to UM–10.

Controller CR–1 is generally similar to the controller disclosed in the U. S. patent application of E. J. Leonard, for a Crossbar-Switch Line-Finder System, Serial No. 468,443, filed November 12, 1954, now Patent No. 2,768,240, such controller being arranged to respond to a ground tens and units mark. The units mark from the relayless line circuit, is different from the units mark of the noted Leonard application, but the operation of the controller is generally similar, as will appear hereinafter.

A detailed description of the invention will now be given by describing the operations involved in extending a connection from a calling line, such as line L1, to an idle originating trunk OT1 extending to an idle connector. A further description will then deal with the operation of the connector in further extending the connection to a called line L10 and in applying ringing current thereon to signal the called party.

In response to the removal of the receiver (not shown) by the subscriber at station S1 on line L1, the usual line loop is closed across the tip and ring conductors T and R, closing an operate circuit for the associated common line relay CL–1. This circuit is from a negative 50-volt potential to a negative 75-volt potential through the winding of the common line relay CL–1, break contacts 12 of the tens group relay 201 of controller CR–1, rectifier 115, extension conductor ET–1, the calling line loop, rectifier 111, and resistor 112.

Line relay CL–1 operates from the current flow resulting from the 25-volt difference between the two potentials and at its make contacts grounds the tens mark wire TM–1 indicating to controller CR–1 that a call is waiting in the first ten-line group.

Calls from other ten-line groups may simultaneously or overlappingly operate their associated common line relay to ground the associated tens-mark wire thereby indicating calls from other groups but a selecting switch arrangement is provided, as will hereinafter be described, which individualizes the controller with only one common line relay at any one time.

The ground on the tens mark conductor TM–1 is extended through rectifier 265 and through break contacts 2 of start relay 212 to the battery-connected winding of preference shift relay 213.

Preference shift relay 213 operates and at its make contacts 1 and 2 advances each of the switches 241 and 242 one step and at its contacts 3 closes an operate circuit for start relay 212.

Start relay 212 operates from ground on the release wire RLSE and locks thereto through its make contacts 5. Make contacts 1 of relay 212 close an operate circuit for time relay 214 which operates and times the interval that controller CR–1 may be held for use on any one call; its break contacts 2 open the operate circuit of relay 213; its make contacts 4 extend ground potential to lock wire L; its make contacts 6 cause the tens switch 241 to progressively advance its brushes across its associated contact bank in search for the calling ten-line group of lines; and its make contacts 3 connect the battery-connected winding of the tens-test relay 211 to the brush of tens switch 241 in preparation for detecting the calling ten-line group in response to the brush of switch 241 engaging the grounded tens-mark conductor TM–1.

Assuming the one pulse generated by preference shift relay 213 to have advanced the brushes of switch 241 to position "1," the battery potential appearing on the brush of switch 241 from the battery-connected winding of relay 211 is extended through the winding of tens-group relay 201 to the ground appearing on the tens mark conductor TM–1, operating the tens-group relay 201 and the tens-test relay 211 in series.

Responsive to the operation of the tens-group relay 201, battery potential from current-limiting resistor 112, through rectifier 111, over the calling line loop, over conductor ET–1, through make contact 1 of relay 201, and through break contacts 1 of relay 216 appears on the brush of units switch 242, which responsive to the noted operation of relay 211, advances its brush across its contact bank under control of interrupter P240. At the same time, relay 201 locks operated at its contacts 11 and at its break contacts 12 restores common line relay CL–1.

Responsive to the engagement of the brush of the units switch 242 with the switch bank contacts associated with units mark wire UM–1, units test relay 215 operates from current flow resulting from the 25-volt difference potential appearing on wire UM–1 and locks to the ground on lock wire L. At the time that switch 242 was advancing, the extension conductor ET–1 was free from all unnecessary current consuming sources as relay CL–1 was open-circuited by the operation of relay 201.

As described in the noted Leonard application, controller CR–1, in response to the operation of relay 215, functions to cause finder switch FS to extend a connection from the calling line L1 to an idle originating trunk OT1 extending to the next switching stage. Responsive to seizure of the next stage, ground is returned on sleeve conductor S which is connected to the midpoint of rectifier 111 and resistor 112. At such time, controller CR–1 is cleared out and returned to normal use in preparation for another call.

Upon completion of the described line-finding action and the consequent seizure of connector CONN–1, the battery- and ground-connected windings of the battery-feed line relay of the connector are connected to the tip and ring conductors of the calling lines over originating trunk OT1 and through finder switch FS. Also, ground potential is present on the sleeve conductor of the relayless line circuit.

Responsive to the appearance of ground at the midpoint of rectifier 111 and resistor 112, all current flow from the tip and ring conductors of the calling line through any elements of the relayless line circuit ceases as the ground potential on the sleeve conductor masks the negative 75-volt potential. The operation is as follows:

Assuming that connector CONN–1 was seized with reversing relay REV restored, then ground potential from the upper winding of the line relay of the connector appears on the tip conductor T of the line circuit and negative 50 volts from the lower winding of the line relay appears on the ring conductor R of the line circuit.

With ground from the tip conductor appearing on one side of rectifier 115 and negative 50-volt battery potential appearing on the other side, no current flows through rectifier 115 as it is poled to permit current flow only when the tip conductor is more negative than the line relay winding battery supply, such condition only being present during line-finding action when the negative 75 volts is not masked by ground on the sleeve conductor.

The appearance of negative 50-volt potential on the ring conductor does not permit current flow through rectifier 111 to the grounded sleeve conductor as rectifier 111 is poled to permit current flow only when the ring conductor is more positive than the potential appearing on resistor 112, such condition also only arising during line-finding action.

Assuming that the reverse relay in connector CONN–1 operated to provide supervisory functions, then a negative 50-volt potential appears on the tip conductor T and ground potential appears on the ring conductor R. Under such conditions, rectifier 115 has a negative 50-volt potential on both sides and rectifier 111 has ground potential on both sides and consequently no current flows from either line conductor through the line circuit impedance elements.

In addition to the disclosed arrangement preventing any parasitic current flow through the line circuit elements from the line conductors after line-finding action, the common line relay arrangement is such that its operation is positive and reliable as regards line leakage. The common line relay does not operate from the cumulative line leakage to ground of a number of lines effectively in parallel as rectifier 115 is poled to permit current flow from the line conductors only when they are more negative than the negative 50-volt potential of the winding of the line relay. Further, the common line relay is arranged to be reliably restored upon completion of line-finding action irrespective of the low bridging resistance of a number of lines as its operate circuit is open by the controller, as previously noted.

In addition to the foregoing, the rectifiers, such as 115 and 116, isolate each line from the others so that fault conditions on one of the lines will not disable the others.

From the foregoing, it can be seen that current flows through the relayless line circuit impedance elements only during call-initiation to thus operate the common line relay. At all other times, parasitic current flow therethrough is prevented.

The following portion of the description relates to the operation of the connector in extending the desired connection to a called line and in signalling the subscriber thereat.

Responsive to the dialing of the directory number of the called subscriber, operations occur in connector CONN–1 and its associated controller (not shown) to operate the connector switches CS to extend the connection to the called line in the well-known manner.

When connector switch CS operates to extend a connection to line L10, ground is projected forward on the sleeve conductor S and grounds the midpoint of the series rectifier 113 and associated resistor 114 of line L10, thereby preventing any parasitic current flow from the line conductors of the called line in the manner previously described for preventing parasitic current flow from the line conductors of a calling line.

Following the operation of switches CS, the ring start relay R1–ST and ringing interrupter RING–INT of connector CONN–1 are operated to supply ringing current to the called line in the well-known manner.

As noted, rectifiers 113 and 115 are so poled as to permit current flow only when the ring conductor becomes more positive than ground or the tip conductor becomes more negative than ground, and unless compensated for the amplitude of the usual ringing voltage which normally exceeds 50 volts in both the positive and negative directions, would permit the line conductors to assume potentials which would permit rectifiers 111 and 116 to conduct. The consequent current drain would thereby effectively reduce the ringing voltage. To prevent conduction of the rectifier during ringing voltage application, one of the generator supply leads is connected to a negative 150 volt potential through resistor 120, and the other lead is connected to ground. In this way, the tip conductor is maintained at a ground potential so that no current flows through rectifier 116 during ringing and the ring conductor is maintained negative with respect to ground from the negative 150 volt superimposed ringing voltage so that no current flows through rectifier 113. Thus, the positive and negative half cycles of the ringing voltage do not overcome the sleeve masking arrangement.

Responsive to called line answer, the ringing generator is disconnected from the line conductors and the usual back-bridge relay or called battery-feed supply relay is connected to the line conductors, the potentials on the called line conductors then being the same as previously described with reference to seizure of the connector, and current flow through the rectifiers is prevented.

From the foregoing, it can be seen that during called party signalling and after called party answer thereby, parasitic current flow from either line conductor through the impedance network is also completely restricted.

While I have described above the principles of my invention in connection with specific apparatus, it is to be clearly understood that this description is made only by way of example and not as a limitation to the scope of my invention.

I claim:

1. In a communication system, a switchboard terminating a group of normally open lines any one of which becomes closed when calling, a direct-current source common to the lines and connected to each line to supply signalling current flow thereover in a given direction when calling, the connection from the current source to any line including an individual path which includes a resistive element adjacent to one pole of the current source and a serially related uni-directional diode adjacent to the line, call-detecting means including means for detecting signalling current flow over any line, means for answering a detected call on any line, and means included in the call-answering means for making a connection at the junction of the said resistive element and the said diode thereof which terminates the said flow of signalling current thereover by masking the potential normally applied through the resistive element.

2. A communication system according to claim 1 wherein the said connection to the junction of the resistive element and the said diode thereof establishes a reversed potential across the diode.

3. In a communication system according to claim 2, the said call-detecting means including relay means connected in common between all lines and a second pole of the direct current source in a circuit path which includes a second uni-directional diode for each line connected serially between the relay means and the associated line to permit signalling current of the given direction to flow through the relay means.

4. In a communication system according to claim 3, the said second diodes being poled to prevent any reverse current flow therethrough to isolate the relay means from the calling line responsive to the said potential reversed connection and to isolate each line from all other lines.

5. In a communication system, a switchboard terminating a group of normally open lines any one of which becomes closed when calling, a direct-current source comprising a signalling section and a feeding section connected in series-aiding relationship to provide at least three poles comprising a signalling pole, a feeding pole, and at least one intermediate pole, means grounding one pole other than the signalling pole, the direct-current source being common to the lines and connected to each line to supply signalling current flow thereover in a given direction when calling, the connection of the current source to any line including an individual path comprising a resistive element adjacent to the signalling pole of the current source in series with a uni-directional diode adjacent to the line and including a second path comprising a second uni-directional diode adjacent to the line in series with call-detecting means which is common to all lines and adjacent to an intermediate pole of the current source, means included in the said call-detecting means for detecting signalling current flow over any line, and connecting means responsive to the detection of signalling current for making a connection to the first path at the junction of the said resistive element and the said diode which terminates the said flow of signalling current by masking the potential normally applied through the resistive element.

6. In a communication system according to claim 5, the said connecting means for masking the potential normally applied through the resistive element including means for connecting the grounded one of the said poles of the current source of the said junction of the resistive element and the associated diode.

7. In a communication system according to claim 5, means including in the connecting means for connecting the feeding section of the direct-current source to the calling line to permit feed current flow thereover in a given direction and to restrict such flow through any of the associated diodes by applying the potential of the feeding section to the answered line with a polarity such that a reversed potential is established across the last-said diodes.

8. In a communication system according to claim 7, means included in the call-answering means for reversing the polarity of the feeding section potential applied to the calling line to reverse the direction of the feed current flow and to establish a zero potential across the diodes of the calling line whereby reversed current flow therethrough is prevented.

9. A communication system according to claim 5 wherein any said normally open line may be a called line which becomes closed when answered, call-extending means for extending a connection from any calling line to a called line, and means in the call-extending means for applying a potential to the junction of the resistive element and associated diode of the called line which establishes a reversed potential across the diode when the called line answers to thereby prevent any signalling current flow therethrough.

10. In a communication system according to claim 9, an alternating-current ringing source, means for applying the potential of the ringing current source to any unanswered called line, and means for maintaining the ringing potential supplied by the said source at a direct-current level with respect to the said potential applied to the said junction such that the applied alternating current ringing potential does not establish a forward potential condition across the diodes associated with the called line during application of ringing current potential thereto.

11. In a communication system according to claim 10, the means for maintaining the ringing potential at the said level including means for superimposing the alternating current ringing potential on a direct-current source having a potential exceeding the potential of any said half cycle.

References Cited in the file of this patent

UNITED STATES PATENTS

| | | |
|---|---|---|
| 2,697,750 | Buchner et al. | Dec. 21, 1954 |
| 2,699,476 | Faulkner | Jan. 11, 1955 |